(12) United States Patent
Moeneclaey et al.

(10) Patent No.: US 12,494,951 B2
(45) Date of Patent: Dec. 9, 2025

(54) DEVICE FOR CAN BUS

(71) Applicant: STMicroelectronics International N.V., Geneva (CH)

(72) Inventors: Nicolas Moeneclaey, Vourey (FR); Gilles Troussel, Grenoble (FR); Christophe Tourniol, Vif (FR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 64 days.

(21) Appl. No.: 18/639,419

(22) Filed: Apr. 18, 2024

(65) Prior Publication Data

US 2024/0356784 A1 Oct. 24, 2024

(30) Foreign Application Priority Data

Apr. 19, 2023 (FR) ........................... 2303890

(51) Int. Cl.
*H04L 25/02* (2006.01)
*H04L 12/40* (2006.01)

(52) U.S. Cl.
CPC ...... *H04L 25/026* (2013.01); *H04L 12/40013* (2013.01); *H04L 25/0272* (2013.01); *H04L 25/0292* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 2001/0040466 A1 | 11/2001 | Ide | |
| 2004/0150434 A1 | 8/2004 | Lu | |
| 2010/0073036 A1 | 3/2010 | Takeuchi | |
| 2016/0149578 A1 | 5/2016 | Lee | |
| 2020/0252066 A1* | 8/2020 | de Haas | H03M 9/00 |
| 2022/0417056 A1* | 12/2022 | Pannwitz | H04L 12/40039 |
| 2023/0058343 A1 | 2/2023 | Delshadpour | |

FOREIGN PATENT DOCUMENTS

| | | | | |
|---|---|---|---|---|
| DE | 102021207199 A1 | | 1/2023 | |
| WO | WO-2023280474 A1 | * | 1/2023 | ....... H04L 12/40032 |
| WO | WO-2023280488 A1 | * | 1/2023 | ....... H04L 12/40032 |

* cited by examiner

*Primary Examiner* — Anh Q Tran
(74) *Attorney, Agent, or Firm* — Slater Matsil, LLP

(57) ABSTRACT

The present disclosure relates to device including first and second terminals connected to a bus, third and fourth terminals connected to power supply and reference potentials. A first transistor and a first resistor are in series between the first terminal and a first diode connected to the third terminal. A second resistor, a second transistor and a second diode are in series between the first and fourth terminals. A third transistor and a third resistor are in series between the first diode and the second terminal. A fourth resistor, a fourth transistor and a third diode are in series between the second and fourth terminals. At each consecutive transmission of a dominant bit and of a recessive bit, a circuit sets the transistors at the ON state during a time period starting with the recessive bit.

20 Claims, 3 Drawing Sheets

DEVICE FOR CAN BUS

CROSS-REFERENCE TO RELATED APPLICATIONS

This application claims the priority benefit of French patent application number 2303890, filed on Apr. 19, 2023, entitled "Dispositif pour BUS CAN", which is hereby incorporated by reference in its entirety.

TECHNICAL FIELD

The present disclosure relates generally to electronic circuits and more particularly to electronic circuits intended to be connected to a two-wire bus in order to communicate.

BACKGROUND

Numerous two-wire buses are known. One of these known two-wire buses is the CAN (Controller Area Network) bus, for example, standardized in the ISO 11898 standard. In its FD (Flex Datarate) version, the data bus speed is different between the data transmission phases and the arbitration and acknowledgment phases.

New developments introduced restrictions in the networks based on CAN FD buses, these restrictions for example regarding the cancellation of oscillation in the signals transmitted over the CAN FD bus of a network, for example, a complex network having a star topology. When the emitting/receiving devices connected to a CAN FD bus comply these restrictions, defined for example in the document "CiA 601-4" available at the address www.can-cçia.org/groups/specifications, the bus is for example called CAN FD SIC (CAN FD Signal Improvement Capability) bus.

However, the known emitting and/or receiving devices intended to be connected to a two-wire CAN FD SIC bus have various drawbacks, for example regarding the compliance with the SIC restrictions.

SUMMARY

In an embodiment, a device includes first and second terminals intended to be connected to first and second lines of a two-wire bus, respectively, and third and fourth terminals intended to be connected to power supply and reference potentials, respectively. The device further includes a first diode having a first electrode connected to the third terminal. The device further includes a first branch including a first PMOS transistor and a first resistor in series between a second electrode of the first diode and the first terminal, and a second resistor, a second NMOS transistor and a second diode in series between the first and fourth terminals. The device further includes a second branch including a third PMOS transistor and a third resistor in series between the second electrode of the first diode and the second terminal, and a fourth resistor, a fourth NMOS transistor and a third diode in series between the second and fourth terminals. The device further includes a control circuit configured, at each consecutive transmission of a dominant bit and of a recessive bit on the two-wire bus by the device, to set the first PMOS, second NMOS, third PMOS, and fourth NMOS transistors at the ON state during a whole first time period starting with the recessive bit. In an embodiment, the first diode has its anode on the third terminal side, the second diode has its anode on the first terminal side, and the third diode has its anode on the second terminal side. In an embodiment, the first PMOS transistor is connected between the first diode and the first resistor, a first source of the first PMOS transistor being on the first diode side, the second NMOS transistor is connected between the second diode and the fourth terminal, a second source of the second NMOS transistor being on the fourth terminal side, the third PMOS transistor is connected between the first diode and the third resistor, a third source of the third PMOS transistor being on the first diode side, and the fourth NMOS transistor is connected between the third diode and the fourth terminal, a fourth source of the fourth NMOS transistor being on the fourth terminal side. In an embodiment, the first, second, third, and fourth resistors have resistance values substantially equal to 100 ohms minus a value of the ON resistance of the first PMOS, second NMOS, third PMOS, and fourth NMOS transistors. In an embodiment, each of the first PMOS, second NMOS, third PMOS, and fourth NMOS transistors has its source connected to its body region. In an embodiment, the first and third PMOS transistors are identical to each other, the second and fourth NMOS transistors being identical to each other. In an embodiment, each of the first, second, and third diodes is implemented by at least one diode-connected MOS transistor. In an embodiment, a first source of the first PMOS transistor is connected to a third source of the third PMOS transistor, a first gate of the first PMOS transistor is connected to a third gate of the third PMOS transistor, and the control circuit includes a sixth resistor connected between the first source and the first gate of the first PMOS transistor, and a first current source configured to deliver a first current to the sixth resistor during the whole duration of each first time period. In an embodiment, the control circuit includes a first switch. In an embodiment, the sixth resistor, the first switch, and the first current source are series connected in this order between the first source of the first PMOS transistor and the fourth terminal. In an embodiment, the control circuit is configured to set the first switch in the ON state during the whole duration of each first time period. In an embodiment, the second and fourth NMOS transistors have their sources connected to the fourth terminal, a second gate of the second NMOS transistor is connected to a fourth gate of the fourth NMOS transistor, and the control circuit includes a seventh resistor connected between a second source and the second gate of the second NMOS transistor, and a second current source configured to deliver a second current to the seventh resistor during the whole duration of each first time period. In an embodiment, the control circuit comprises a second switch. In an embodiment, the second current source, the second switch, and the seventh resistor are series connected in this order between the first source of the first PMOS transistor and the fourth terminal. In an embodiment, the control circuit is configured to set the second switch at the ON state during the whole duration of each first time period. In an embodiment, the control circuit includes a first capacitor connected in parallel to the sixth resistor, and a second capacitor connected in parallel to the seventh resistor. In an embodiment, the device further includes a read/write circuit configured to deliver to the control circuit, at each consecutive transmission of a dominant bit and of a recessive bit on the two-wire bus by the device, a signal indicating the beginning and the end of the corresponding first time period.

In another embodiment, a network includes a serial two-wire bus having a first line and a second line and a plurality of devices. Each device has its first terminal connected to the first line, its second terminal connected to the second line, its third terminal intended to be connected to a power supply potential, and its fourth terminal connected to a reference potential. A first device of the plurality of devices includes a first diode having a first electrode connected to a third terminal of the first device. The first device further includes a first branch including a first PMOS transistor and a first resistor in series between a second electrode of the first diode and a first terminal of the first device, and a second resistor, a second NMOS transistor and a second diode in series between the first terminal and fourth terminal of the first device. The first device further includes a second branch including a third PMOS transistor and a third resistor in series between the second electrode of the first diode and a second terminal of the first device, and a fourth resistor, a fourth NMOS transistor and a third diode in series between the second terminal and the fourth terminal of the first device. The first device further includes a control circuit configured, at each consecutive transmission of a dominant bit and of a recessive bit on the serial two-wire bus by the first device, to set the first PMOS, second NMOS, third PMOS, and fourth NMOS transistors at the ON state during a whole first time period starting with the recessive bit. In an embodiment, the first PMOS transistor is connected between the first diode and the first resistor, a first source of the first PMOS transistor being on the first diode side, the second NMOS transistor is connected between the second diode and the fourth terminal, a second source of the second NMOS transistor being on the fourth terminal side, the third PMOS transistor is connected between the first diode and the third resistor, a third source of the third PMOS transistor being on the first diode side, and the fourth NMOS transistor is connected between the third diode and the fourth terminal, a fourth source of the fourth NMOS transistor being on the fourth terminal side. In an embodiment, a first source of the first PMOS transistor is connected to a third source of the third PMOS transistor, a first gate of the first PMOS transistor is connected to a third gate of the third PMOS transistor, and the control circuit includes a sixth resistor connected between the first source and the first gate of the first PMOS transistor, and a first current source configured to deliver a first current to the sixth resistor during the whole duration of each first time period. In an embodiment, the control circuit includes a first switch. In an embodiment, the sixth resistor, the first switch, and the first current source are series connected in this order between the first source of the first PMOS transistor and the fourth terminal. In an embodiment, the control circuit is configured to set the first switch in the ON state during the whole duration of each first time period. In an embodiment, the second and fourth NMOS transistors have their sources connected to the fourth terminal, a second gate of the second NMOS transistor is connected to a fourth gate of the fourth NMOS transistor, and the control circuit includes a seventh resistor connected between a second source and the second gate of the second NMOS transistor, and a second current source configured to deliver a second current to the seventh resistor during the whole duration of each first time period. In an embodiment, the control circuit includes a second switch. In an embodiment, the second current source, the second switch, and the seventh resistor are series connected in this order between a first source of the first PMOS transistor and the fourth terminal. In an embodiment, the control circuit is configured to set the second switch at the ON state during the whole duration of each first time period.

In yet another embodiment, a vehicle includes a network. The network includes a serial two-wire bus having a first line and a second line and a plurality of devices. Each device having its first terminal connected to the first line, its second terminal connected to the second line, its third terminal intended to be connected to a power supply potential, and its fourth terminal connected to a reference potential. A first device of the plurality of devices includes a first diode having a first electrode connected to a third terminal of the first device. The first device further includes a first branch including a first PMOS transistor and a first resistor in series between a second electrode of the first diode and a first terminal of the first device, and a second resistor, a second NMOS transistor and a second diode in series between the first terminal and a fourth terminal of the first device. The first device further includes a second branch including a third PMOS transistor and a third resistor in series between the second electrode of the first diode and a second terminal of the first device, and a fourth resistor, a fourth NMOS transistor and a third diode in series between the second terminal and the fourth terminal of the first device. The first device further includes a control circuit configured, at each consecutive transmission of a dominant bit and of a recessive bit on the serial two-wire bus by the first device, to set the first PMOS, second NMOS, third PMOS, and fourth NMOS transistors at the ON state during a whole first time period starting with the recessive bit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the CAN FD buses are well known by those skilled in the art and all the detail for implementing such buses, for example as regards the known communication protocols implemented on these buses, have not been described in detail, the described embodiments being compatible with these known buses. In addition, the known applications, for example automotive vehicles, in which a bus, e.g. of the CAN FD SIC type, may be implemented have not been described in detail, the described embodiments being compatible with these known applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

There is a need to address all or some of the drawbacks of the known emitting and/or receiving devices intended to be connected to a serial two-wire bus over which dominant bits and recessive bits are transmitted, for example a CAN FD bus. For example, there is a need to address in these devices, all or some of the drawbacks relative to the cancellation of the oscillation over the bus, so as to comply the CAN FD SIC restrictions, for example.

Some embodiments address all or some of the drawbacks of the known emitting and/or receiving devices intended to be connected to a serial two-wire bus over which dominant bits and recessive bits are transmitted, such as a CAN FD bus. For example, some embodiments address all or some of the drawbacks of these devices relative to the cancellation of the oscillation over the bus, so as to comply the CAN FD SIC restrictions, for example.

Figure 1:
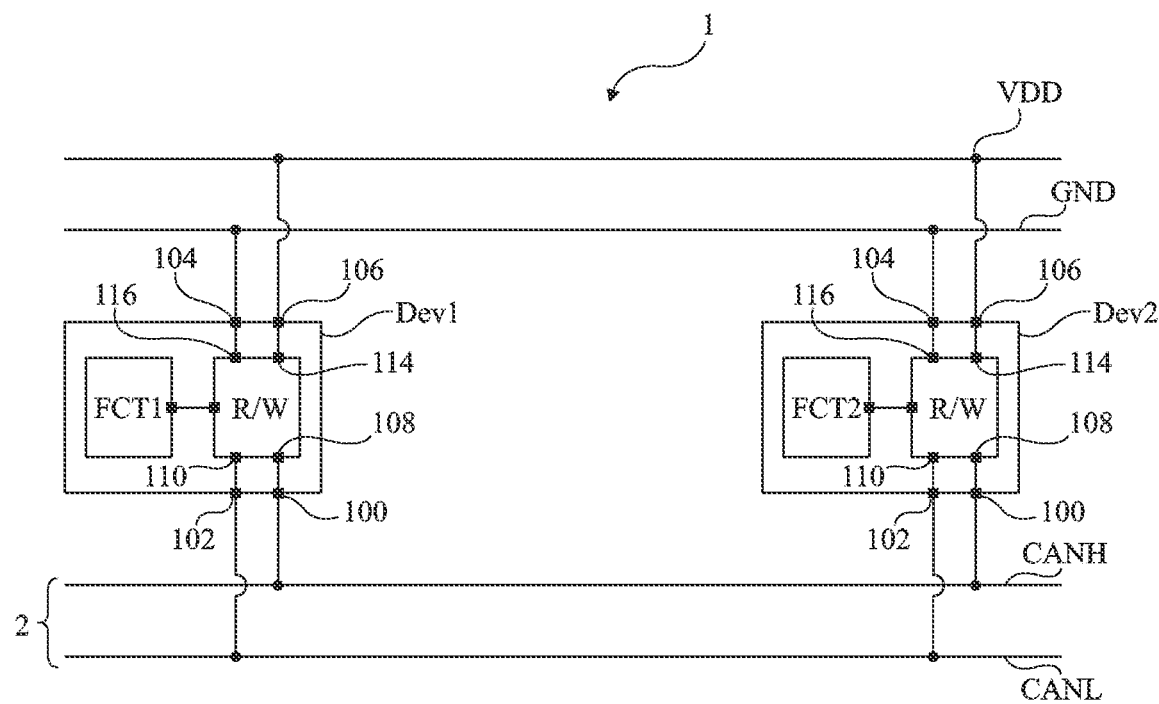
FIG. 1 schematically illustrates in block form an example system comprising several devices connected to a two-wire serial bus, for example a FD CAN bus.

FIG. 1 schematically illustrates in block form an example system or network 1 comprising several devices connected to a two-wire serial bus 2, for example a FD CAN bus. More particularly, FIG. 1 illustrates only a part of this system where two devices Dev1 and Dev2 are connected to the bus 2, given that in practice more than two devices of the type of the devices Dev1 and Dev2 may be connected to the bus 2.

The bus 2 comprises two conductive lines CANH, for example called high line, and CANL, for example called low line. The signals transmitted on the bus 2 are differential signals taken between the two lines CANH and CANL.

Each of the devices Dev1 and Dev2 connected to the bus 2 comprises a terminal 100 connected to the line CANH, and a terminal 102 connected to the line CANL of the bus. The devices Dev1, Dev2 connected to the bus 2 are configured to transmit recessive bits and dominant bits on the bus 2, for example corresponding to logic states '1' and '0', respectively. When a device connected to the bus 2 emits (or writes) a dominant bit on the bus 2, this dominant bit overwrites possible recessive bits concurrently emitted (or written) on the bus 2 by other devices connected to the bus.

Each of the devices Dev1 and Dev2 connected to the bus 2 further comprises a terminal 104 connected to a reference potential, and a terminal 106 connected to a supply potential, the potential difference between the terminals 104 and 106 of each device allowing the device to be supplied. In the example of FIG. 1, all the devices Dev1, Dev2 connected to the bus 2 have their terminal 104 connected to the same reference potential GND, e.g. ground, and their terminal 106 connected to the same supply potential VDD. In alternative examples, the devices connected to the bus 2 may receive supply potentials and/or reference potentials significantly different between the two devices. As an example, each device Dev1, Dev2 connected to the bus 2 receives a supply potential substantially equal, for example equal, to 5 V at its terminal 106, this potential being referenced with respect to the ground potential GND received by the terminal 104 of the device.

To write and read the bits on the bus 2, each of the devices Dev1 and Dev2 connected to the bus 2 comprises a circuit R/W. The circuit R/W comprises terminals 108 and 110 connected to the respective terminals 100 and 102 of the device to which it belongs. As an example, each circuit R/W further comprises terminals 116 and 114 connected to the respective terminals 104 and 106 of the device to which it belongs, so that a supply voltage is received.

By way of example, each circuit R/W is configured to implement the CAN FD protocol. For example, when a device Dev1 or Dev2 connected to the bus 2 writes a dominant bit on the bus, its circuit R/W is configured to set the line CANH to a voltage substantially equal, for example equal, to 3.5 V, and the line CANL to a voltage substantially equal, for example equal, to 1.5 V. For example, when a device Dev1 or Dev2 connected to the bus 2 writes a recessive bit on the bus, its circuit R/W is configured to set the line CANH and the line CANL to a voltage substantially equal, for example equal, to half the supply voltage present between the terminals 104 and 106 of the device, for example at a voltage substantially equal, for example equal, to 2.5 V. By way of example, each circuit R/W comprises a pull-up resistor connected between its terminal CANL and a node at a voltage substantially equal, for example equal, to half the supply voltage present between its terminals 116 and 114, and a pull-up resistor connected between its terminal CANH and this same node. As an example, these pull-up resistors have a value in the order of 35 kohms.

By way of example, each device Dev1, Dev2 connected to the bus 2 implements one or more functions, schematically represented with a block FCT1 for the device Dev1, and with a block FCT2 for the device Dev2. As an example, the block FCT1, respectively FCT2, of the device Dev1, respectively Dev2, is connected to the circuit R/W of this device, for example to provide to the same bits to be transmitted on the bus 2 and/or to receive bits read on the bus 2.

Figure 2:
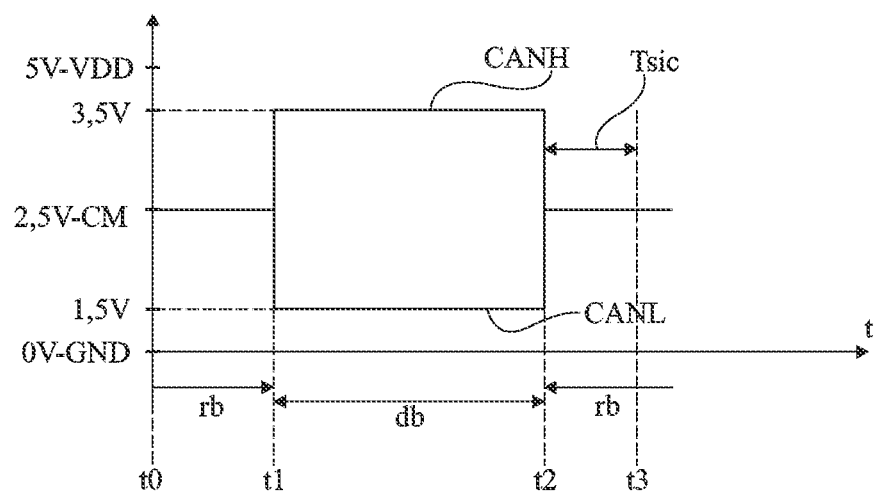
FIG. 2 illustrates with time diagram, the issues of oscillations in signals transmitted on the bus of the system shown in FIG. 1.

FIG. 2 illustrates with time diagrams, the issues of oscillations in signals transmitted on the bus 2 of the system 1 shown in FIG. 1. Thus, in the example of FIG. 2, the potential VDD is substantially equal, for example equal, to 5 V, and the reference potential GND is zero (0 V).

This FIG. 2 illustrates the evolution of the voltages on the lines CANH and CANL of the bus 2 during the consecutive transmission of a recessive bit rb, of a dominant db, and of a further recessive bit rb.

Thus, at a time t0 during the transmission of a bit rb, the voltage on the line CANH is substantially equal, for example equal, to the voltage on the line CANL, this voltage being substantially equal, for example equal, to 2.5 V in this example and corresponding to the common mode of a signal transmitted on the pair of lines CANH and CANL.

At a following time t1, the transmission of the bit rb is ended, and the transmission of a bit db starts. The device Dev1 or Dev2 writing the bit db on the bus 2 (FIG. 1) then sets the voltage on the line CANH at a value substantially equal, for example equal, to 3.5 V, and the voltage on the line CANH at a value substantially equal, for example equal, to 1.5 V.

At a following time t2, the transmission of the bit db is ended and the transmission of the bit rb starts. Thus, the voltages on the lines CANH and CANL are at least theoretically, substantially equal to each other, and at the value of the common mode CM. However, in practice, due to the reflections of signals on each of the lines CANH and CANL, oscillations (not shown in FIG. 2) occur on each of the lines CANH and CANL, thereby the differential voltage between the lines CANH and CANL can have values being interpreted as corresponding to the transmission of a dominant bit on the bus 2.

It would then be desirable to have devices like the devices Dev1 and Dev2 being intended to be connected to the bus 2, and allowing parasitic oscillations on the lines CANH and CANL occurring at each beginning of a recessive bit rb immediately following a dominant bit rb, to be reduced or even eliminated.

For example, it would then be desirable to have a device intended to be connected to the bus 2 allowing at each transmission by the device on the bus 2 of a dominant bit db immediately followed with a recessive bit rb, a differential impedance between the lines CANH and CANL in the order of 100 ohms during a time period Tsic starting with the recessive bit rb to be guaranteed, and further, an end of line impedance in the order of 50 ohms on each of the lines CANH and CANL during this time period Tsic to be guaranteed. As represented in FIG. 2 relative to the bit rb the transmission of which starts at the time t2, the time period ends before the end of the emission of the corresponding recessive bit rb, for example, at a time t3 later than the time t2 in the example of FIG. 2.

Furthermore, it would also be desirable that this device intended to be connected to the bus 2 allows handling and/or absorbing fluctuations of the value of the mode CM, these fluctuations having values capable of reaching up to 40 V or −40 V with respect to the nominal common mode CM, for example substantially equal to 2.5 V.

Here is provided a circuit, or device, intended to be implemented in a device of the type of the devices Dev1 and Dev2 previously described, i.e. in a device intended to be connected to a serial two-wire bus on which dominant and recessive bits are transmitted via the differential voltage between the two lines of the bus. The proposed device allows all or some of the drawbacks of the known devices Dev1 and Dev2 intended to be connected to such a bus.

For example, the proposed device allows implementing during the whole duration of each time period Tsic at the beginning of a recessive bit transmitted by the device immediately following a dominant bit transmitted by this same device, the values of differential and end of line impedances hereinabove recited.

Figure 3:
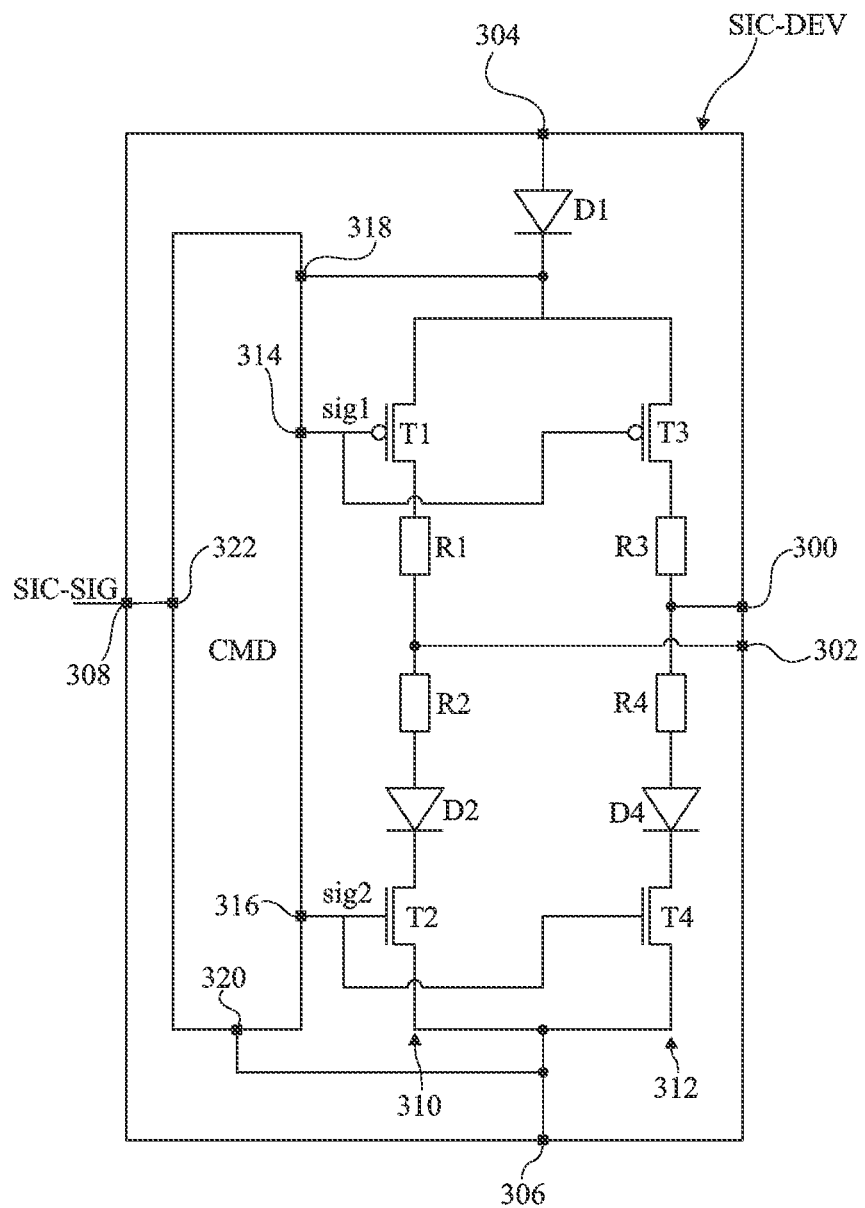
FIG. 3 schematically illustrates an embodiment of a device allowing the oscillations in signals transmitted on the bus of the type shown in FIG. 1 to be reduced.

FIG. 3 schematically illustrates an embodiment of such a device referenced SIC-DEV in FIG. 3.

As represented in FIG. 3, the device SIC-DEV is intended to be part, or is part, of a device Dev1' similar to the devices Dev1 and Dev2 previously described. Thus, unless indicated otherwise, all that were described relative to devices Dev 1 and Dev2 applies to the device Dev1'.

Particularly, the device Dev1' comprises the same terminals 100, 102, 104, and 106 as the devices Dev1 and Dev2.

The device Dev1' comprises, as the devices Dev1 and Dev2, a circuit R/W having its terminals 108, 110, 116, and 114 connected to the terminals 100, 102, 104, and 106 of the device Dev1', like in FIG. 1 relative to the devices Dev1 and Dev2.

However, as compared to the circuits R/W described in relation with FIG. 1, the circuit R/W of the device Dev1' is preferably further configured to deliver at each consecutive transmission of a dominant bit and of a recessive bit on the bus 2 by the device Dev1', a signal SIC-SIG indicating the beginning and the end of the corresponding time period Tsic. For example, the signal SIC-SIG is a binary signal in a first binary state during each time period Tsic, and in a second binary state otherwise.

Figure 5:
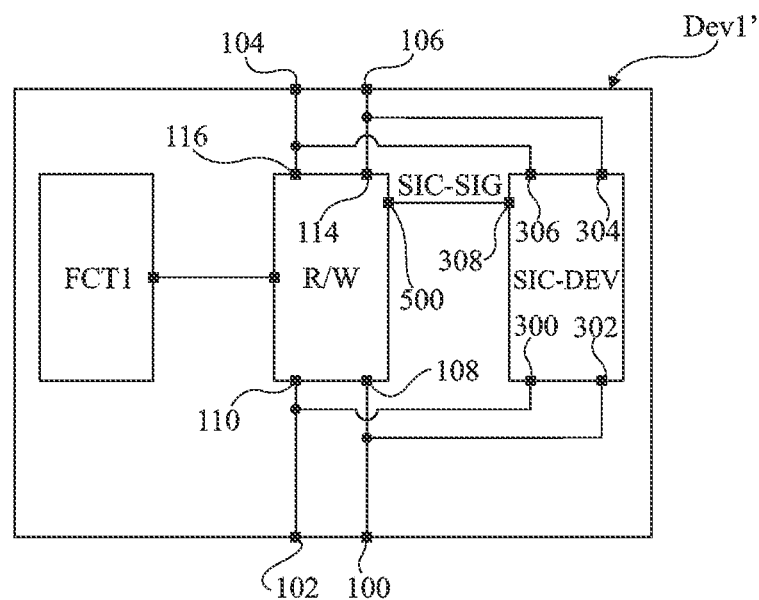
FIG. 5 schematically illustrates in block form an embodiment of a device intended to be connected to a bus of the type shown in FIG. 1, and comprising the device of FIG. 3.

Like the previously described devices Dev1 and Dev2, the device Dev1' comprises one or more circuits implementing features of the device Dev1', these circuits being illustrated in the form of a block FCT1 in FIG. 5. As an example, the block FCT1 of the device Dev1' is connected to the circuit R/W of the device Dev1', for example to deliver to the circuit R/W bits to be transmitted on the bus and/or to receive from the circuit R/W the bits read on the bus.

As compared to the devices Dev1 and Dev2, the device Dev1' further comprises the device SIC-DEV.

As represented in FIG. 3 and in FIG. 5, the device SIC-DEV comprises a terminal 300 intended to be connected to the line CANL, this terminal 300 being thus connected to the terminal 102 of the device Dev1' in FIG. 5, and a terminal 302 intended to be connected to the line CANH, this terminal 302 being thus connected to the terminal 100 of the device Dev1' in FIG. 5.

Further, the circuit SIC-DEV comprises a terminal 304 intended to be connected to a supply potential, this terminal 304 being thus connected to the terminal 106 of the device Dev1' in FIG. 5 to receive the potential VDD, and a terminal 306 intended to be connected to a reference potential, this terminal 306 being thus connected to the terminal 104 of the device Dev1' in FIG. 5 to receive the potential GND.

According to one embodiment, the device SIC-DEV receives, for example on a terminal 308, the signal SIC-SIG provided by the circuit R/W of the device Dev1'. For example, the terminal 308 of the device SIC-DEV is connected to a terminal 500 of the circuit R/W, the terminal 500 delivering the signal SIC-SIG.

As shown in FIG. 3, the device SIC-DEV comprises a diode D1 having a first electrode, for example its anode, connected to the terminal 304, and also a first branch 310 and a second branch 312 each connected between a second electrode of the diode D1, for example its cathode, and the terminal 306.

The branch 310 comprises a transistor PMOS T1 and a resistor R1 serial connected between the diode D1 and the terminal 302. Preferably, the source of the transistor T1 is on the diode D1 side. The branch 310 further comprises a resistor R2, a transistor NMOS T2, and a diode D2 serial connected between the terminals 302 and 306. Preferably, the source of the transistor T2 is on the terminal 306 side.

For example, the transistor T1 is connected between the diode D1 and the resistor R1 in turn connected to the terminal 302, the source of the transistor T1 being connected to the diode D1. For example, the diode D2 is connected between the resistor R2 and the transistor T2, the source of the transistor T2 being on the terminal 306 side, for example connected to the terminal 306. The resistor R2 is for example connected to the terminal 302.

Like the branch 310, the branch 312 comprises a transistor PMOS T3 and a resistor R3 series connected between the diode D1 and the terminal 300. Preferably, the source of the transistor T3 is on the diode D1 side. The branch 312 further comprises a resistor R4, a transistor NMOS T4, and a diode D4 series connected between the terminals 300 and 306. Preferably, the source of the transistor T4 is on the diode 306 side.

For example, the transistor T3 is connected between the diode D1 and the resistor R3 in turn connected to the diode D1. For example, the diode D4 is connected between the resistor R4 and the transistor T4, the source of the transistor T4 being on the terminal 306 side, for example connected to the terminal 306. The resistor R4 is for example connected to the terminal 300.

Preferably, the order of connection of the transistor T3 and of the resistor R3 between the diode D1 and the terminal 300 is the same as the order of connection of the transistor T1 and of the resistor R1 between the diode D1 and the terminal 302.

Preferably, the order of connection of the resistor R4, of the transistor T4, and of the diode D4 between the terminals 300 and 306 is the same as the order of connection of the resistor R3, of the transistor T2, and of the diode D2 between the terminals 302 and 306.

The transistors T1 and T3 have their gates connected to each other, and are thus controlled by a same signal sig1. The sources of the transistors T1 and T3 are connected to each other.

Similarly, the transistors T2 and T4 have their gates connected to each other, and are controlled by a same signal sig2. Further, when the transistors T2 and T4 are connected to the terminal 306, these transistors for example have their sources connected to the terminal 306 and to each other.

According to one embodiment, the diode D1 has its anode on the diode 304 side, for example connected to the diode 304.

According to one embodiment, the diode D2 of the branch 310 has its anode on the terminal 302 side, for example connected to the resistor R2, and the diode D4 of the branch 312 has its anode on the terminal 300 side, for example connected to the resistor R4.

According to one embodiment, the resistors R1, R2, R3, and R4 have resistance values substantially equal, preferably equal, to each other. For example, the resistors R1 to R4 have each a resistance value substantially equal, preferably equal, to 100 ohms minus the value of the ON resistor of the transistors T1 to T4. For example, when the transistors T1 to T4 have an ON resistance equal, or substantially equal, to 10 ohms, the resistors R1 to R4 have each a value equal, or substantially equal, to 90 ohms. Preferably, the resistor R1 has a resistance value substantially equal, for example equal, to 100 ohms minus the value of the ON resistance of the transistor T1 to which it is connected between the terminals 304 and 302, the resistor R2 has a resistance value substantially equal, for example equal, to 100 ohms minus the value of the ON resistance of the transistor T2 to which it is connected between the terminals 304 and 300, the resistor R3 has a resistance value substantially equal, for example equal, to 100 ohms minus the value of the ON resistance of the transistor T3 to which it is connected between the terminals 302 and 306, and the resistor R4 has a resistance value substantially equal, for example equal, to 100 ohms minus the value of the ON resistance of the transistor T4 to which it is connected between the terminals 300 and 306.

According to one embodiment, the transistors T1 and T3 are identical to each other.

According to one embodiment, similarly, the transistors T2 and T4 are identical to each other.

According to one embodiment, the diodes D1, D2, and D4 are each implemented by one or more diodes, for example by one or more transistors MOS each diode-connected.

According to one embodiment, the diodes D2 and D4 are identical to each other.

According to one embodiment, each of the transistors T1, T2, T3, and T4 has its source connected to its body region.

According to one embodiment, the transistors of the branches 310 and 312 are each implemented on a bulk semiconductor substrate, for example made of silicon. However, in alternative embodiments, at least some of these transistors are implemented on a structure of the SOI (Semiconductor On Insulator) type. As an example, when the transistors T1 to T4 are implemented on SOI, the order of connexion of the transistor T1, respectively T3, and of the resistor R1, respectively R3, between the diode D1 and the terminal 300, could be reversed as compared to that is shown in FIG. 3.

The device SIC-DEV further comprises a control circuit CMD. The circuit CMD is configured, at each consecutive transmission of a dominant bit and of a recessive bit on the bus by the device Dev1' comprising the circuit SIC-DEV, to set the transistors T1, T2, T3, and T4 in the ON state during the whole duration of the corresponding time period Tsic. Outside of these time periods Tsic, the circuit CMD is configured to maintain the transistors T1 to T4 in the OFF state. Thus, the circuit CMD provides the signals sig1 for controlling the transistors T1 and T3, and sig2 for controlling the transistors T2 and T4. For example, the circuit CMD comprises a terminal 314 configured to deliver the signal sig1, and a terminal 316 configured to deliver the signal sig2.

According to one embodiment, the sources of the transistors T1 and T3 are connected to each other, and further to a terminal 318 of the circuit CMD.

The circuit CMD further has a terminal 320 connected to the reference potential, this terminal 320 thus being connected to the terminal 306 of the device SIC-DEV.

In the device Dev1' of FIG. 5, throughout each time period Tsic corresponding to the beginning of a recessive bit emitted by the circuit Dev1' immediately following emitting a dominant bit by this same circuit Dev1', the switches T1, T2, T3, and T4 are maintained ON by the circuit CMD. As a result, when the resistors R1 to R4 have each a value substantially equal, preferably equal, to 100 ohms minus the value of the ON resistance of the switches T1 to T4, the differential impedance between the lines CANH and CANL is substantially equal, preferably equal, to 100 ohms, and each of the lines CANH and CANL sees an end of line impedance substantially equal, preferably equal, to 50 ohms with respect to its common mode. When the switches T1 to T4 are maintained open by the circuit CMD, outside of the time period Tsic, the operation of the bus is not modified as compared to the case where the device SIC-DEV is omitted.

Furthermore, the provision of the diode D1 coupling the respective lines CANH and CANL with the potential VDD by means of the anode of the diode D1 on the potential VDD side allows absorbing the positive common mode overvoltage so that this overvoltage does not apply to the potential VDD, or in other words, the potential VDD is not changed by this positive common mode overvoltage. It is true whatever the transistors T1 and T3 are at the OFF state, or at the OFF state. Indeed, in this last case, the positive overvoltage of the common mode of the lines CANH and CAN is propagated in these transistors T1 and T3 via their body diodes. Symmetrically, the provision in the branches 310 and 312 of a diode coupling the respective lines CANH and CANL to the potential GND with the cathode of the diode on the potential VDD side allows absorbing the negative common mode overvoltage so that this overvoltage does not apply to the potential GND, or in other words, that the potential GND is not modified by this negative common mode overvoltage. It is true whatever the transistors T2 and T4 are at the ON state, or at the OFF state. Indeed, in this last case, the negative overvoltage of the common mode of the lines CANH and CAN is propagated in these transistors T2 and T4 via their body diodes.

By way of example, the circuit CMD controls the switches T1 to T4 based on the signal SIC-SIG. In such case, the circuit CMD comprises a terminal 322 connected to the terminal 308 of the circuit SIC-DEV, so that the signal SIC-SIG is received, and that the signals sig1 and sig2 are generated based on the signal SIC-SIG.

Figure 4:
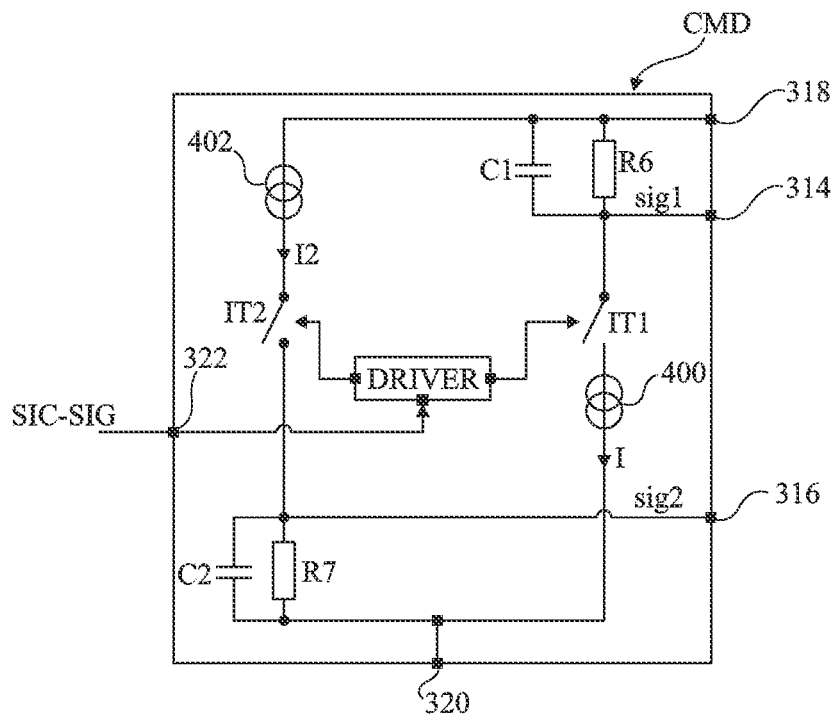
FIG. 4 schematically illustrates an embodiment of a circuit of the device shown in FIG. 3.

FIG. 4 illustrates an example embodiment of the circuit CMD shown in FIG. 3. In the example of FIG. 4, the circuit CMD comprises the terminal 320 configured to be connected to the reference potential GND, and the terminal 318 connected to the sources of the transistors T1 and T3 that are in turn connected to the cathode of the diode D1 (FIG. 3). In this example, the terminal 318 receives a potential acting as local supply potential to the circuit CMD.

The circuit CMD comprises the terminal 314 configured to deliver the signal sig1 for controlling the transistors T1 and T3.

In this embodiment, the circuit CMD comprises a resistor R6 connected between the terminals 318 and 314, i.e. between the source and gate of the transistor T1. The circuit CMD further comprises a current source 400. The current source 400 is configured to deliver at each consecutive transmission of a dominant bit and of a recessive bit on the bus by the device Dev1' comprising the circuit SIC-DEV comprising in turn the circuit CMD, a current I to the resistor R6 during the corresponding time period Tsic, that is during this whole time period Tsic. In addition, the source 400 is configured not to deliver the current I outside these time periods Tsic. Preferably, the current source 400 has a terminal connected to the terminal 320 of the circuit CMD, and a terminal coupled with the resistor R6, more particularly the terminal of the resistor R6 connected to the terminal 314.

Thus, during each time period Tsic, the resistor R6 has a non-zero voltage across its terminals sufficient to set the transistors T1 and T3 ON. The selection of the resistance value of the resistor R6, and of the value of the current I to obtain this operation is in the scope of those skilled in the art.

According to one embodiment, so that the source 400 delivers the current I to the resistor R6 only during the time periods Tsic, the control circuit CMD comprises a switch IT1 connected between the current source 400 and the resistor R6 (terminal 314), and the circuit CMD is configured to set this switch IT1 ON during the whole duration of each time period Tsic, and OFF otherwise. In other words, the resistor R6, the switch IT1, and the current source 400 are series connected in this order, between the terminals 318 and 320.

As an example, the circuit CMD comprises a circuit DRIVER configured to control the switch IT1 according to the way above described. According to one embodiment, the circuit DRIVER has a terminal connected to the terminal 322 to receive the signal SIC-SIG, the circuit DRIVER then controlling the switch IT1 based on the signal SIC-SIG.

According to one embodiment, the current source 400 is configured to be selectively switched off or on by the circuit CMD, for example by the circuit DRIVER, for example based on the signal SIC-SIG. The circuit CMD then enables the source 400 only during the time periods Tsic, and further the switch IT1 is omitted.

The circuit CMD further comprises the terminal 316 configured to deliver the signal sig2 for controlling the transistors T2 and T4.

Since the transistors T2 and T4 have their sources connected to the potential GND (FIG. 3), the implementation in the circuit CMD of a circuit generating the signal sig2, for example based on the signal SIC-SIG, is in the scope of those skilled in the art.

However, it is best to have a balanced behaviour, i.e. a matching, between the control sig1 of the transistors T1 and T3 and the control sig2 of the transistors T2 and T4. Indeed, such a matching between the controls sig1 and sig2 allows that each triggering to the ON state, respectively OFF state, of each transistor T1, T2, T3, and T4 is simultaneous with the triggering to the ON state, respectively OFF state, of the other transistors, thereby these triggering of the transistors T1 to T4 do not alter the value of the common mode.

Thus, according to one embodiment, as shown in FIG. 4, the circuit CMD comprises, between the terminals 318, 320, and 316, a structure for generating the signal sig2 being complementary with (or symmetric to) the structure between the respective terminals 320, 318, and 314.

More particularly, the circuit CMD comprises a resistor R7 connected between the terminals 320 and 316, i.e. between the source and gate of the transistor T2. The circuit CMD further comprises a current source 402. The current source 402 is configured to provide, at each consecutive transmission of a dominant bit and of a recessive bit on the bus by the device Dev1' comprising the circuit SIC-DEV comprising in turn the circuit CMD, a current I2 to the resistor R7 during the whole corresponding time period Tsic. In addition, the source 402 is configured to not deliver the current I2 outside these time periods Tsic. Preferably, the current source 402 has a terminal connected to a terminal 318 of the circuit CMD and a terminal coupled to the resistor R7, more particularly the terminal of the resistor R7 connected to the terminal 316.

Thus, during each time period Tsic, the resistor R7 has a non-zero voltage across its terminals sufficient to set the transistors T2 and T4 ON. The selection of the resistance value of the resistor R7 and of the value of the current I2 to obtain this operation is in the scope of those skilled in the art.

Particularly, those skilled in the art have the capability to provide values of the currents I and I2 and of the resistors R6 and Ry allowing the voltage across the terminals of the resistor R6 and the voltage across the terminals of the resistor R7 to have same values, for example by selecting a same value for the currents I and I2 and a same resistance value for the resistors R6 and R7.

According to one embodiment, although it is not shown, the circuit CMD (or the circuit SIC-DEV to which it belongs) comprises a circuit for calibrating the values of the currents I and I2, so that during a calibration phase, the values of the currents I and I2 are selected to have a control sig1 of the transistors T1 and T3 being balanced with the control sig2 of the transistors T2 and T4.

According to one embodiment wherein the circuit CMD comprises the switch IT1, so that the source 400 delivers the current I2 only during the time periods Tsic, the control circuit CMD comprises a switch IT2 connected between the current source 402 and the resistor R7 (terminal 316), and the circuit CMD is configured to set the switch IT2 at the ON state during the whole duration of each time period Tsic, and at the OFF state otherwise. In other words, the resistor R7, the switch IT2, and the current source 402 are series connected, in this order, between the terminals 318 and 320.

As an example, the circuit DRIVER is configured to control the switch IT2 in the manner hereinabove described, for example based on the signal SIC-SIG.

According to an alternative embodiment wherein the source 400 is configured to be selectively switched ON or OFF by the circuit CMD and the switch IT1 is omitted, the source 402 is also configured to be selectively switched ON or OFF by the circuit CMD, for example by the circuit DRIVER, and the switch IT2 is omitted.

According to one embodiment, wherein the structure of the circuit CMD connected between the terminals 318, 314, and 320 for generating the signal sig1 is complementary to the structure of the circuit CMD connected between the terminals 320, 316, and 318 for generating the signal sig2, in order to improve the matching between the controls sig1 and sig2, a capacitor C1 is connected in parallel to the resistor R6, and a capacitor C2, preferably having the same value as the capacitor C1, is connected in parallel to the resistor R7.

Embodiments and variants were hereinabove described in relation to FIGS. 3 to 5. Although it is not illustrated by a figure, an embodiment provides a system or network similar to that of FIG. 1, except that the devices connected to the bus 2 are replaced by devices Dev1'.

Further, although it is not illustrated by a figure, another embodiment provides a vehicle, for example an automotive vehicle, comprising such a network.

Various embodiments and variants have been described. Those skilled in the art will understand that certain features of these embodiments can be combined and other variants will readily occur to those skilled in the art.

In particular, were described embodiments wherein is targeted a value of end of line resistance of 50 ohms for each of the lines CANH and CANL, and also a differential impedance of 100 ohms between the lines CANH and CANL, and the resistors R1 to R4 then have a value substantially equal to 100 ohms minus the value of the ON resistance of the switches T1 to T4. However, those skilled in the art will have the capability to adapt the value of the resistors R1 to R4 according to embodiments where it would be desirable to have different values of the end of line resistance and of the differential resistance.

Further, although that were described embodiments adapted to a CAN FD bus, the described embodiments also apply to a CAN XL bus, and more generally to serial two-wire buses configured to transmit dominant bits and recessive bits via a differential voltage between the conductive lines of the bus.

One embodiment provides a device comprising:
first and second terminals intended to be connected to first and second lines of a two-wire bus, respectively;
third and fourth terminals intended to be connected to power supply and reference potentials, respectively;
a first diode having a first electrode connected to the third terminal;
a first branch comprising a first transistor and a first resistor in series between a second electrode of the first diode and the first terminal, and a second resistor, a second NMOS transistor, and a second diode in series between the first and fourth terminals;
a second branch comprising a third PMOS transistor and a third resistor in series between the second electrode of the first diode and the second terminal, and a fourth resistor, a fourth NMOS transistor, and a third diode in series between the second and fourth terminals; and
a control circuit configured, at each consecutive transmission of a dominant bit and of a recessive bit on the bus by said device, in order to set said transistors at the ON state during a whole first time period starting with the recessive bit.

According to one embodiment:
the first diode has its anode on the third terminal side;
the second diode has its anode on the first terminal side; and
the third diode has its anode on the second terminal side.

According to one embodiment:
the first transistor is connected between the first diode and the first resistor, its source being for example on the first diode side;
the second transistor is connected between the second diode and the fourth terminal, its source being for example on the fourth terminal side;
the third transistor is connected between the first diode and the third resistor, its source being for example on the first diode side; and
the fourth transistor is connected between the third diode and the fourth terminal, its source being for example on the fourth terminal side.

According to one embodiment, the first, second, third, and fourth resistors have resistance values equal or substantially equal, preferably equal, or substantially equal, to 100 ohms minus a value of an ON-state resistor of the first, second, third, and fourth transistors.

According to one embodiment, each of said transistors has its source connected to its body region.

According to one embodiment, the first and third transistors are identical to each other, the second and fourth transistors being identical to each other.

According to one embodiment, each of the diodes is implemented by at least one diode-connected MOS transistor.

According to one embodiment:
the source of the first transistor is connected to the third terminal;
the gate of the first transistor is connected to the gate of the third transistor; and the control circuit comprises:
a sixth resistor connected between the source and the gate of the first transistor, and
a first current source configured to deliver a current to the sixth resistor during the whole duration of each first time period.

According to one embodiment, the control circuit comprises a first switch;
the sixth resistor, the first switch, and the first current source are series connected in this order between the source of the first transistor and the fourth terminal; and
the control circuit is configured to set the first switch at the ON state during the whole duration of each first time period.

According to one embodiment:
the second and fourth transistors have their sources connected to the fourth terminal;
the gate of the second transistor is connected to the gate of the fourth transistor; and the control circuit comprises:
a seventh resistor connected between the source and the gate of the second transistor, and
a second current source configured to deliver a current to the seventh resistor during the whole duration of each first time period.

According to one embodiment:
the control circuit comprises a second switch;
the second current source, the second switch, and the seventh resistor are series connected in this order between the source of the first transistor and the fourth terminal; and
the control circuit is configured to set the second switch at the ON state during the whole duration of each first time period.

According to one embodiment, the control circuit comprises a first capacitor connected in parallel to the sixth resistor, and a second capacitor connected in parallel to the seventh resistor.

According to one embodiment, the device further comprises a read/write circuit of the bus configured to deliver to the control circuit, at each successive transmission of a dominant bit and of a recessive bit on the bus by said device, a signal indicating the beginning and the end of the corresponding first time period.

Another embodiment provides a network comprising:
a serial two-wire bus having a first line and a second line; and
a plurality of devices as previously described, each device having its first terminal connected to the first line, and its second terminal connected to the second line.

Another embodiment provides a vehicle comprising such a network.

Finally, the practical implementation of the embodiments and variants described herein is within the capabilities of those skilled in the art based on the functional description provided hereinabove.

What is claimed is:

1. A device comprising:
    first and second terminals intended to be connected to first and second lines of a two-wire bus, respectively;
    third and fourth terminals intended to be connected to power supply and reference potentials, respectively;
    a first diode having a first electrode connected to the third terminal;
    a first branch comprising a first PMOS transistor and a first resistor in series between a second electrode of the first diode and the first terminal, and a second resistor, a second NMOS transistor and a second diode in series between the first and fourth terminals;
    a second branch comprising a third PMOS transistor and a third resistor in series between the second electrode of the first diode and the second terminal, and a fourth resistor, a fourth NMOS transistor and a third diode in series between the second and fourth terminals; and
    a control circuit configured, at each consecutive transmission of a dominant bit and of a recessive bit on the two-wire bus by the device, to set the first PMOS, second NMOS, third PMOS, and fourth NMOS transistors at the ON state during a whole first time period starting with the recessive bit.

2. The device according to claim 1, wherein:
    the first diode has its anode on the third terminal side;
    the second diode has its anode on the first terminal side; and
    the third diode has its anode on the second terminal side.

3. The device according to claim 1, wherein:
    the first PMOS transistor is connected between the first diode and the first resistor, a first source of the first PMOS transistor being on the first diode side;
    the second NMOS transistor is connected between the second diode and the fourth terminal, a second source of the second NMOS transistor being on the fourth terminal side;
    the third PMOS transistor is connected between the first diode and the third resistor, a third source of the third PMOS transistor being on the first diode side; and
    the fourth NMOS transistor is connected between the third diode and the fourth terminal, a fourth source of the fourth NMOS transistor being on the fourth terminal side.

4. The device according to claim 1, wherein the first, second, third, and fourth resistors have resistance values substantially equal to 100 ohms minus a value of the ON resistance of the first PMOS, second NMOS, third PMOS, and fourth NMOS transistors.

5. The device according to claim 1, wherein each of the first PMOS, second NMOS, third PMOS, and fourth NMOS transistors has its source connected to its body region.

6. The device according to claim 1, wherein the first and third PMOS transistors are identical to each other, the second and fourth NMOS transistors being identical to each other.

7. The device according to claim 1, wherein each of the first, second, and third diodes is implemented by at least one diode-connected MOS transistor.

8. The device according to claim 1, wherein:
    a first source of the first PMOS transistor is connected to a third source of the third PMOS transistor;
    a first gate of the first PMOS transistor is connected to a third gate of the third PMOS transistor; and
    the control circuit comprises:
        a sixth resistor connected between the first source and the first gate of the first PMOS transistor; and
        a first current source configured to deliver a first current to the sixth resistor during the whole duration of each first time period.

9. The device according to claim 8, wherein:
    the control circuit comprises a first switch;
    the sixth resistor, the first switch, and the first current source are series connected in this order between the first source of the first PMOS transistor and the fourth terminal; and
    the control circuit is configured to set the first switch in the ON state during the whole duration of each first time period.

10. The device according to claim 8, wherein:
    the second and fourth NMOS transistors have their sources connected to the fourth terminal;
    a second gate of the second NMOS transistor is connected to a fourth gate of the fourth NMOS transistor; and
    the control circuit comprises:
        a seventh resistor connected between a second source and the second gate of the second NMOS transistor; and
        a second current source configured to deliver a second current to the seventh resistor during the whole duration of each first time period.

11. The device according to claim 10, wherein:
    the control circuit comprises a second switch;
    the second current source, the second switch, and the seventh resistor are series connected in this order between the first source of the first PMOS transistor and the fourth terminal; and
    the control circuit is configured to set the second switch at the ON state during the whole duration of each first time period.

12. The device according to claim 10, wherein the control circuit comprises a first capacitor connected in parallel to the sixth resistor, and a second capacitor connected in parallel to the seventh resistor.

13. The device according to claim 1, further comprising a read/write circuit configured to deliver to the control circuit, at each consecutive transmission of a dominant bit and of a recessive bit on the two-wire bus by the device, a signal indicating the beginning and the end of the corresponding first time period.

14. A network comprising:
    a serial two-wire bus having a first line and a second line; and
    a plurality of devices, each device having its first terminal connected to the first line, its second terminal connected to the second line, its third terminal intended to be connected to a power supply potential, and its fourth terminal connected to a reference potential, wherein a first device of the plurality of devices comprises:
a first diode having a first electrode connected to a third terminal of the first device;
a first branch comprising a first PMOS transistor and a first resistor in series between a second electrode of the first diode and a first terminal of the first device, and a second resistor, a second NMOS transistor and a second diode in series between the first terminal and fourth terminal of the first device;
a second branch comprising a third PMOS transistor and a third resistor in series between the second electrode of the first diode and a second terminal of the first device, and a fourth resistor, a fourth NMOS transistor and a third diode in series between the second terminal and the fourth terminal of the first device; and
a control circuit configured, at each consecutive transmission of a dominant bit and of a recessive bit on the serial two-wire bus by the first device, to set the first PMOS, second NMOS, third PMOS, and fourth NMOS transistors at the ON state during a whole first time period starting with the recessive bit.

15. The network according to claim 14, wherein:
the first PMOS transistor is connected between the first diode and the first resistor, a first source of the first PMOS transistor being on the first diode side;
the second NMOS transistor is connected between the second diode and the fourth terminal, a second source of the second NMOS transistor being on the fourth terminal side;
the third PMOS transistor is connected between the first diode and the third resistor, a third source of the third PMOS transistor being on the first diode side; and
the fourth NMOS transistor is connected between the third diode and the fourth terminal, a fourth source of the fourth NMOS transistor being on the fourth terminal side.

16. The network according to claim 14, wherein:
a first source of the first PMOS transistor is connected to a third source of the third PMOS transistor;
a first gate of the first PMOS transistor is connected to a third gate of the third PMOS transistor; and
the control circuit comprises:
a sixth resistor connected between the first source and the first gate of the first PMOS transistor; and
a first current source configured to deliver a first current to the sixth resistor during the whole duration of each first time period.

17. The network according to claim 16, wherein:
the control circuit comprises a first switch;
the sixth resistor, the first switch, and the first current source are series connected in this order between the first source of the first PMOS transistor and the fourth terminal; and
the control circuit is configured to set the first switch in the ON state during the whole duration of each first time period.

18. The network according to claim 14, wherein:
the second and fourth NMOS transistors have their sources connected to the fourth terminal;
a second gate of the second NMOS transistor is connected to a fourth gate of the fourth NMOS transistor; and
the control circuit comprises:
a seventh resistor connected between a second source and the second gate of the second NMOS transistor; and
a second current source configured to deliver a second current to the seventh resistor during the whole duration of each first time period.

19. The network according to claim 18, wherein:
the control circuit comprises a second switch;
the second current source, the second switch, and the seventh resistor are series connected in this order between a first source of the first PMOS transistor and the fourth terminal; and
the control circuit is configured to set the second switch at the ON state during the whole duration of each first time period.

20. A vehicle comprising a network, wherein the network comprises:
a serial two-wire bus having a first line and a second line; and
a plurality of devices, each device having its first terminal connected to the first line, its second terminal connected to the second line, its third terminal intended to be connected to a power supply potential, and its fourth terminal connected to a reference potential, wherein a first device of the plurality of devices comprises:
a first diode having a first electrode connected to a third terminal of the first device;
a first branch comprising a first PMOS transistor and a first resistor in series between a second electrode of the first diode and a first terminal of the first device, and a second resistor, a second NMOS transistor and a second diode in series between the first terminal and a fourth terminal of the first device;
a second branch comprising a third PMOS transistor and a third resistor in series between the second electrode of the first diode and a second terminal of the first device, and a fourth resistor, a fourth NMOS transistor and a third diode in series between the second terminal and the fourth terminal of the first device; and
a control circuit configured, at each consecutive transmission of a dominant bit and of a recessive bit on the serial two-wire bus by the first device, to set the first PMOS, second NMOS, third PMOS, and fourth NMOS transistors at the ON state during a whole first time period starting with the recessive bit.

* * * * *